(12) United States Patent
Osaka et al.

(10) Patent No.: US 8,690,354 B2
(45) Date of Patent: Apr. 8, 2014

(54) MOBILE ELECTRONIC DEVICE WITH AN IMAGE PROJECTOR

(75) Inventors: Masashi Osaka, Yokohama (JP);
Yasuhiro Ueno, Yokohama (JP);
Yasushi Kitamura, Yokohama (JP);
Seiji Horii, Yokohama (JP); Jouji Yoshikawa, Yokohama (JP); Tomoko Asano, Yokohama (JP); Hiroki Itou, Yokohama (JP)

(73) Assignee: Kyocera Corporation, Kyoto (JP)

( * ) Notice: Subject to any disclaimer, the term of this patent is extended or adjusted under 35 U.S.C. 154(b) by 274 days.

(21) Appl. No.: 13/202,809

(22) PCT Filed: Feb. 25, 2010

(86) PCT No.: PCT/JP2010/052930
§ 371 (c)(1),
(2), (4) Date: Aug. 23, 2011

(87) PCT Pub. No.: WO2010/098375
PCT Pub. Date: Sep. 2, 2010

(65) Prior Publication Data
US 2011/0304834 A1    Dec. 15, 2011

(30) Foreign Application Priority Data
Feb. 25, 2009   (JP) .................................. 2009-043198

(51) Int. Cl.
*G03B 21/00*    (2006.01)
*G06K 9/20*    (2006.01)
*G06K 9/36*    (2006.01)

(52) U.S. Cl.
USPC ............... 353/85; 353/119; 353/31; 345/207; 382/236; 382/317; 250/491.1

(58) Field of Classification Search
USPC ...................... 353/85, 119, 31; 345/204, 207; 382/236, 317; 250/491.1
See application file for complete search history.

(56) References Cited

U.S. PATENT DOCUMENTS

2007/0182936 A1 *   8/2007   Suzuki ............................ 353/69
2007/0298850 A1    12/2007   Miyata et al.

(Continued)

FOREIGN PATENT DOCUMENTS

| JP | 2004-101622 A | 4/2004 |
| JP | 2006-020272 A | 1/2006 |

(Continued)

OTHER PUBLICATIONS

International Search Report for PCT/JP2010/052930 mailed Apr. 27, 2010.

(Continued)

*Primary Examiner* — Tony Ko
*Assistant Examiner* — Magda Cruz
(74) *Attorney, Agent, or Firm* — Lowe Hauptman & Ham, LLP

(57) ABSTRACT

It is a task to provide a mobile electronic device with high operability and high safety. The mobile electronic device includes an image projector that projects an image, a cabinet, an input unit that is disposed on the cabinet and detects an operation input by an operator, and a control unit that controls the operation of the image projector and the state of the input unit. The task is solved in such a manner that when a predetermined operation is detected by the input unit, the control unit stops emission of light from the image projector or reduces an amount of light emitted from the image projector.

9 Claims, 9 Drawing Sheets

(56) References Cited

U.S. PATENT DOCUMENTS

2009/0033888 A1* 2/2009 Nozaki et al. ............... 353/119
2010/0060618 A1* 3/2010 Okuda et al. ............... 345/204

FOREIGN PATENT DOCUMENTS

| JP | 2006-203646 A | 8/2006 |
| JP | 2007-078808 A | 3/2007 |
| JP | 2007-096542 A | 4/2007 |
| JP | 2007-228551 A | 9/2007 |
| JP | 2009-003428 A | 1/2009 |
| JP | 2009-010755 A | 1/2009 |

OTHER PUBLICATIONS

Office Action corresponding to JP 2009-043198, dated Dec. 11, 2012.

* cited by examiner

FIG.9A

|  | OPERATING MODE | |
|---|---|---|
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | NOT SELECTABLE | SELECTABLE |

FIG.9B

|  | OPERATING MODE | |
|---|---|---|
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | SELECTABLE | SELECTABLE |

FIG.9C

|  | OPERATING MODE | |
|---|---|---|
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | NOT SELECTABLE | SELECTABLE |

FIG.9D

|  | OPERATING MODE | |
|---|---|---|
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | SELECTABLE | SELECTABLE |

MOBILE ELECTRONIC DEVICE WITH AN IMAGE PROJECTOR

CROSS-REFERENCE TO RELATED APPLICATION

This application is a National Stage of International application No. PCT/JP2010/052930 filed on Feb. 25, 2010, and which is based upon and claims the benefit of priority from Japanese patent application No. 2009-43198, filed on Feb. 25, 2009.

TECHNICAL FIELD

The present invention relates to a mobile electronic device including an image projector for projecting an image to a screen or to a wall surface.

BACKGROUND ART

As a conventional device for projecting an image to a wall surface or a screen, a so-called projector is used. A mainstream of the projector is a so-called stationary type device which is supplied with power from a commercial power supply and is used when it is fixed to a predetermined location. A projector as the stationary type projects, in its fixed state, an image to a given portion of the wall surface or to the screen.

Recently, on the other hand, a mobile projector compact in size and easy to carry is proposed as the projector. For example, Patent Literature 1 describes a mobile terminal with a projector function which incorporates a projector that includes an upper cabinet, a lower cabinet, and a hinge portion for mutually pivotally connecting the upper cabinet and the lower cabinet and that has a lens and a light source.

This type of mobile projector can easily change an area to which an image is projected by the projector. That is, the projector can easily change a light irradiation direction. Therefore, the light may be unintentionally irradiated to a person. Because the projector irradiates high-intensity light, if the light irradiated from the projector directly enters person's eyes at a close position, the person is very dazzled by the irradiated light.

In terms of this point, for example, Patent Literature 2 describes a mobile communication terminal with a projection function that includes a projector for projecting projection data, a detector for detecting a state of the mobile communication terminal, a movement determining unit for determining whether there is any change in the state detected by the detector, and a control unit for sending the projection data to the projector. The mobile communication terminal is capable of controlling a light amount when a person enters a projected light area by transmitting control data for controlling a light amount to be projected by the control unit when the movement determining unit determines that there is a change in the state of the terminal.

CITATION LIST

Patent Literature

Patent Literature 1: Japanese patent application Laid-open No. 2007-96542
Patent Literature 2: Japanese patent application Laid-open No. 2007-228551

DISCLOSURE OF INVENTION

Problem to be Solved by the Invention

As described in Patent Literature 2, when the state of the terminal changes, the amount of light output from the projector is reduced or the output thereof is stopped, so that a possibility that a direct light may enter person's eyes or that the person may be dazzled by the light can be reduced while an operator is operating the terminal.

In this way, the terminal described in Patent Literature 2 can reduce or stop light emitted from the projector only by touching it. However, a person who does not know how to operate the projector does not know how to stop the projector, so that the person cannot reduce the amount of light to be output or cannot stop the output in such a case that someone suddenly enters an area irradiated with the light. Therefore, even in the terminal described in Patent Literature 2, a strong light may enter the person's eye, and the person may be dazzled thereby.

It is an object of the present invention to provide a user-friendly mobile electronic device with high operability.

SUMMARY OF THE INVENTION

According to an aspect of the present invention, a mobile electronic device includes: an image projector that projects an image; a cabinet; an input unit that is disposed on the cabinet and detects an operation input by an operator; and a control unit that controls an operation of the image projector and a state of the input unit. When a predetermined operation is detected by the input unit, the control unit stops emission of light from the image projector or reduces an amount of light emitted from the image projector.

According to another aspect of the present invention, the input unit is provided respectively on two or more faces of external faces of the cabinet.

According to another aspect of the present invention, the mobile electronic device further includes a direction detection sensor that detects a direction of the cabinet. Of the respective input units provided on the faces, the control unit enables the input unit, to be used, provided on one of the faces other than a face on an under side in a vertical direction, based on a result of detection by the direction detection sensor.

According to another aspect of the present invention, of the respective input units provided on the faces, the control unit enables the input unit, to be used, provided on one of the faces other than the face on the under side in the vertical direction and the face where the image projector is provided, based on a result of detection by the direction detection sensor.

According to another aspect of the present invention, the control unit causes a portion used for the predetermined operation in the input unit to emit light when an image is projected by the image projector.

According to another aspect of the present invention, the input unit is a touch sensor. Preferably, the input unit is a button.

According to another aspect of the present invention, the input unit is an acceleration detector that detects an acceleration acting on the cabinet.

According to another aspect of the present invention, after the emission of light from the image projector is stopped or the amount of light emitted from the image projector is reduced, the control unit causes the image projector not to increase the amount of light emitted therefrom until a resume instruction input to the input unit is detected.

Effect of the Invention

The mobile electronic device according to the present invention can perform more appropriate control by controlling the amount of light to be emitted from the image projector based on a signal received from the input unit.

BRIEF DESCRIPTION OF DRAWINGS

FIG. 9A is an explanatory diagram of one example of controls in the mobile electronic device.

FIG. 9B is an explanatory diagram of one example of controls in the mobile electronic device.

FIG. 9C is an explanatory diagram of one example of controls in the mobile electronic device.

FIG. 9D is an explanatory diagram of one example of controls in the mobile electronic device.

DESCRIPTION OF EMBODIMENTS

The present invention will be explained in detail below with reference to the drawings. It should be noted that the present invention is not limited by the following explanation. Besides, the components explained in the following include those that can be easily thought of by persons skilled in the art, and substantially equivalents or those in an equivalent scope. A mobile phone as a mobile electronic device will be explained hereinafter as an example, however, an applied target of the present invention is not limited to the mobile phone. The present invention can also be applied to, for example, PHS (Personal Handyphone System), PDA, a portable navigation device, a notebook-size personal computer, and a game machine.

Figure 1:
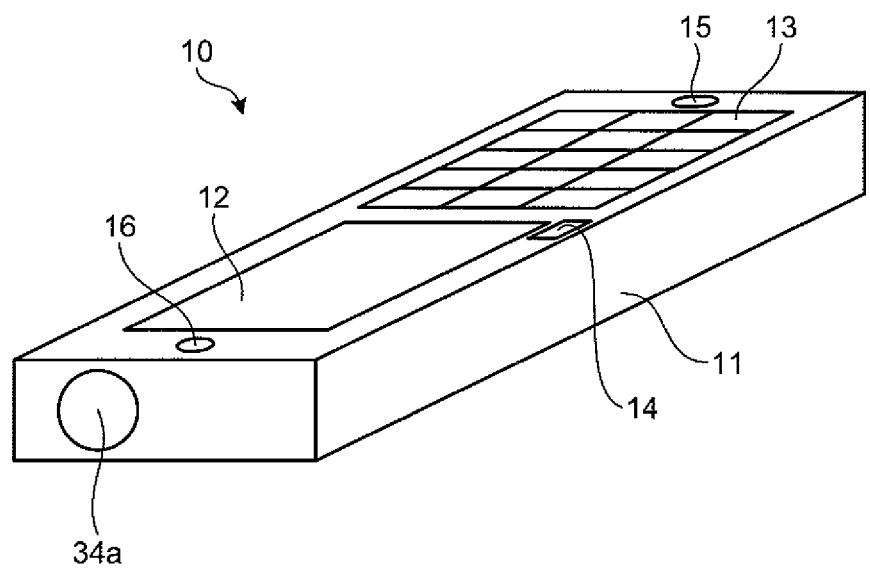
FIG. 1 is a perspective view illustrating a schematic configuration of one embodiment of a mobile electronic device.

First, an external configuration of the mobile electronic device is explained. FIG. 1 is a perspective view illustrating a schematic configuration of one embodiment of the mobile electronic device. A mobile electronic device 10 is a mobile phone provided with a wireless communication function. The mobile electronic device 10 is a straight mobile phone with units stored inside of one box-shaped cabinet 11. In the present invention, the cabinet 11 is formed to a box shape, however, the cabinet may be formed with two members coupled to each other by a hinge and thereby be foldable, or the cabinet may be configured to have two members which are slidable. A cabinet connected with three or more members can also be used.

The cabinet 11 is provided with a display 12 as a display unit illustrated in FIG. 1. The display 12 displays a predetermined image, such as a standby image when the mobile electronic device 10 is in a standby state for waiting for reception and a menu image used to help operation of the mobile electronic device 10.

The cabinet 11 is provided with a plurality of operation keys 13 used to enter a telephone number of an intended party or to enter text when email is created. In addition, a dedicated key 14 for controlling operations of a projector 34, explained later, is provided in one of faces of the cabinet 11 where the operation keys 13 are provided. The operation keys 13 and the dedicated key 14 constitute an operating unit of the mobile electronic device 10. A built-in light emitter such as a light emitting diode is provided in the operation keys 13 and the dedicated key 14, and light is emitted as necessary. The cabinet 11 is further provided with a microphone 15 that receives voice during talking on the mobile electronic device 10, and with a receiver 16 that emits voice during talking on the mobile electronic device 10.

A light emitting portion 34a of the projector 34 for projecting an image is provided on a top face of the cabinet 11 (a face whose one side meets a shorter side of the face where the operation keys 13 are provided).

Figure 2:
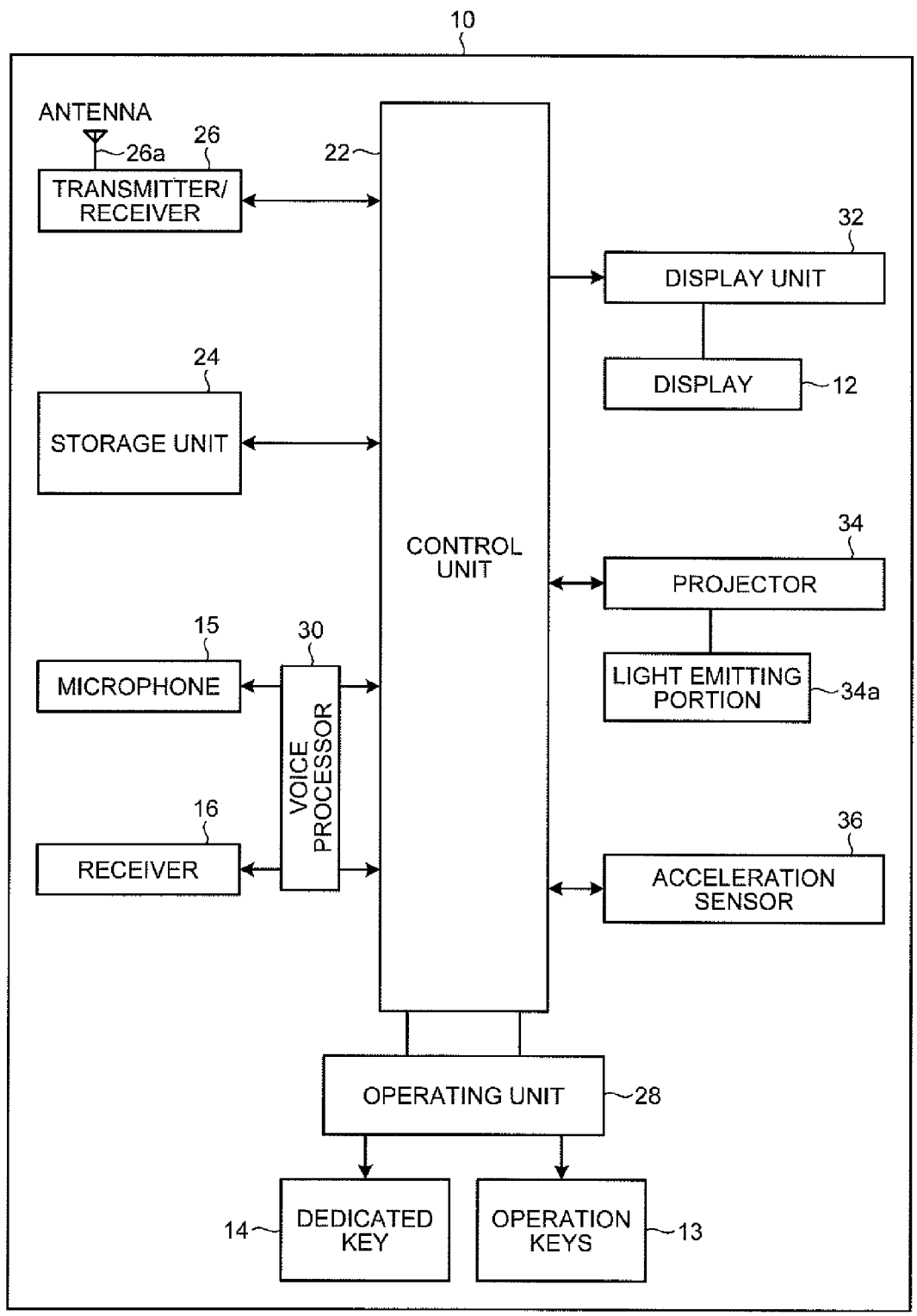
FIG. 2 is a block diagram of the schematic configuration of the mobile electronic device illustrated in FIG. 1.

FIG. 2 is a block diagram illustrating the schematic configuration of functions of the mobile electronic device as illustrated in FIG. 1. The mobile electronic device 10 as illustrated in FIG. 2 includes a control unit 22, a storage unit 24, a transmitter/receiver 26, an operating unit 28, a voice processor 30, a display unit 32, the projector 34, and an acceleration sensor 36.

The control unit 22 is a processor such as a CPU (central processing unit) that integrally controls an overall operation of the mobile electronic device 10. That is, the control unit 22 controls the operations of the transmitter/receiver 26, the voice processor 30, and the display unit 32 or the like so that the various processes of the mobile electronic device 10 are executed in an appropriate sequence according to the operation of the operating unit 28 and software stored in the storage unit 24 of the mobile electronic device 10. The various processes of the mobile electronic device 10 include, for example, voice communication performed through a line switching network, creation and transmission/reception of an electronic mail, and browsing to a Web (World Wide Web) site on the Internet. In addition, the operations of the transmitter/receiver 26, the voice processor 30, and the display unit 32 or the like include signal transmission/reception by the transmitter/receiver 26, voice input/output by the voice processor 30, and display of an image by the display unit 32.

The control unit 22 executes processes based on programs (e.g., operating system program and application programs) stored in the storage unit 24. The control unit 22 is formed with, for example, a MPU (Micro Processing Unit), and executes the various processes of the mobile electronic device 10 according to the sequence instructed by the software. That is, the control unit 22 sequentially loads operation codes from the operating system program and the application programs stored in the storage unit 24, and executes the processes.

The control unit 22 has a function of executing a plurality of application programs. The application program executed by the control unit 22 includes a plurality of application programs such as an application program for controlling the drive of the projector and game application programs for activating various games.

The storage unit 24 stores therein software and data used for processes performed by the control unit 22, a task for activating an application program that controls the drive of the projector and a task for activating various game application programs.

The storage unit 24 stores therein, in addition to these tasks, for example, voice data through communication and downloaded voice data, or software used by the control unit 22 for controlling the storage unit 24, and telephone numbers and email addresses of communication opposite parties, and also stores therein addresses to be managed, a sound file of a dial tone and a ring tone or the like, temporary data used for a process of software. The computer programs and the temporary data used for the processes of the software are temporarily stored in a work area allocated to the storage unit 24 by the control unit 22. The storage unit 24 is formed with, for example, a nonvolatile storage device (e.g., nonvolatile semiconductor memory such as ROM: Read Only Memory, and a hard disk drive), and a readable/writable storage device (e.g., SRAM: Static Random Access Memory, and DRAM: Dynamic Random Access Memory).

The transmitter/receiver 26 includes an antenna 26a, and establishes a wireless signal line based on CDMA system with a base station through a channel allocated by the base station, and performs telephone communication and information communication with a base station.

The operating unit 28 is formed with the operation keys 13 such as Power key, Talk key, Numeric keys, Character keys, Direction key, OK key, and Send key to which various functions are allocated respectively, and with the dedicated key 14. When these keys are used to enter information through the operation by the user, the operating unit 28 emits a signal corresponding to the content of the operation. The emitted signal is input to the control unit 22 as an instruction of the user.

The voice processor 30 executes processes of a voice signal input to the microphone 15 and a voice signal output from the receiver 16. That is, the voice processor 30 amplifies the voice input through the microphone 15, subjects the voice to AD conversion (Analog to Digital conversion), then further subjects the voice to signal processing such as coding, converts the coded voice to digital voice data, and outputs the digital voice data to the control unit 22. Moreover, the voice processor 30 decodes the digital voice data sent from the control unit 22, subjects the decoded data to DA conversion (Digital to Analog conversion), subjects the converted data to processes such as amplification to be converted to an analog voice signal, and outputs the analog voice signal to the receiver 16.

The display unit 32 is provided with a display panel (such as the display 12) formed with a LCD (Liquid Crystal Display) or an organic EL (Electro-Luminescence) panel or the like, and displays a video image according to video data supplied from the control unit 22 and an image according to image data on the display panel. The display unit 32 may be provided with, for example, a sub-display at a location that is exposed to the outside even when the cabinet is closed, in addition to the display 12.

Figure 3:
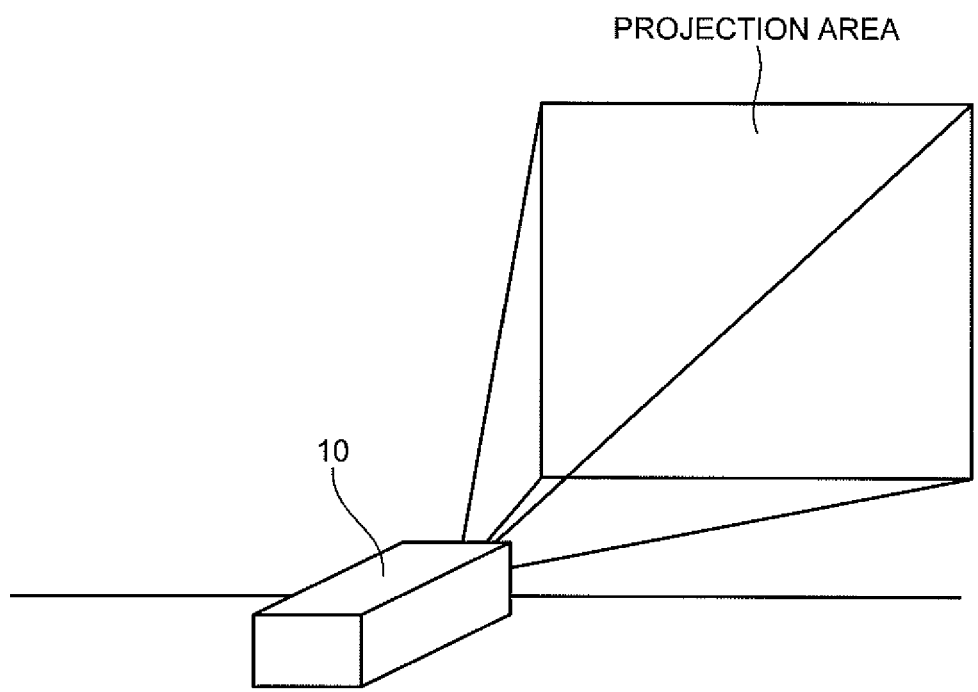
FIG. 3 is an explanatory diagram illustrating a state in which an image is displayed by the mobile electronic device illustrated in FIG. 1.

The projector 34 is an image projection mechanism for projecting an image, and, as explained above, is provided with the light emitting portion 34a for projecting an image, on the top face of the cabinet 11. FIG. 3 is an explanatory diagram illustrating a state in which an image is displayed by the mobile electronic device as illustrated in FIG. 1. The mobile electronic device 10 projects an image from the light emitting portion 34a of the projector 34. In other words, by emitting the light forming the image, as illustrated in FIG. 3, an image can be projected to a given area (projection area) of a wall surface or a screen on a plane opposite to the top face of the cabinet 11. The operation of projector 34 is controlled by the control unit 22, so that various video images such as films and presentation materials sent from the control unit 22 are projected and displayed on the projection area.

The projector 34 is formed with a light source and an optical system that switches whether the light emitted from the light source is projected, according to the image data. For example, a projector configured with a halogen light, a LED light source, or an LD light source as the light source and with an LCD (Liquid Crystal Display) or a DMD (Digital Micromirror Device) as the optical system can be used as the projector 34. In this case, the optical system is provided over the whole area of the projection area corresponding to pixels, and the optical system is turned on or off by synchronizing the light emitted from the light source with the image, so that the image can be projected over the whole area of the projection area. A projector configured with a light source that emits laser light, and with an optical system that includes a switching element for switching whether the light emitted from the light source is to be transmitted and a mirror for subjecting the light having passed through the switching element to raster scanning can be used as the projector 34. In this case, by changing an angle of the light emitted from the laser light by the mirror and scanning the light irradiated from the light source over the whole area of the projection area, the image can be projected to the projection area.

The acceleration sensor 36 is a detector that detects an acceleration applied to the cabinet 11. As the acceleration sensor 36, a detector that detects an acceleration using various methods can be used. For example, a detector that detects an acceleration based on a change in capacitance, a change in piezo resistance, or a change in relative positions can be used. The acceleration sensor 36 detects an acceleration acting on the cabinet 11 when the operator shakes or moves the cabinet 11. The mobile electronic device 10 is basically configured in the above manner.

Figure 4:
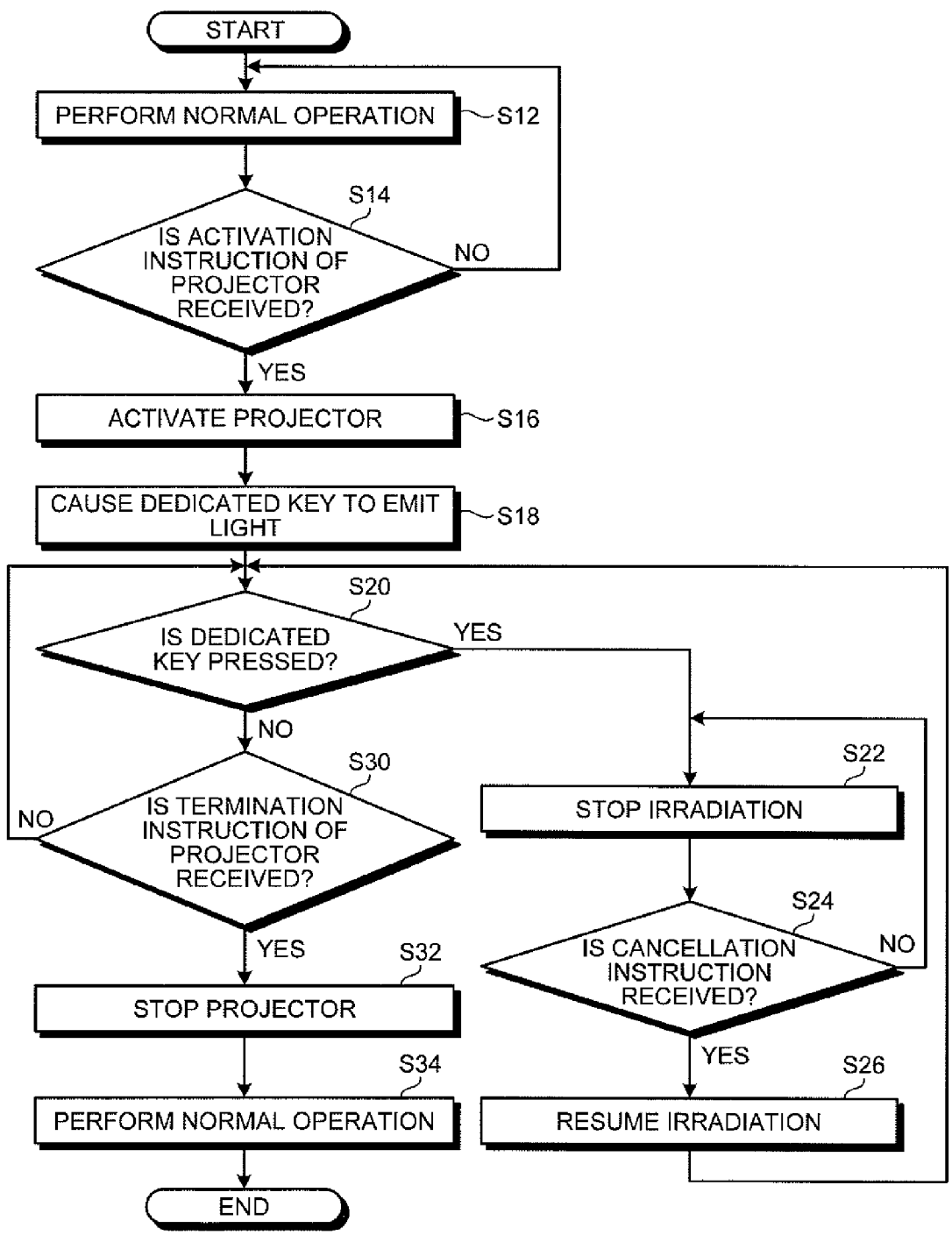
FIG. 4 is a flowchart illustrating one example of the operation of the mobile electronic device.

Next, the operation of the mobile electronic device 10, specifically, the control operation of the projector will be explained with reference to FIG. 4. FIG. 4 is a flowchart illustrating an example of the operation of the mobile electronic device. First, the mobile electronic device 10 performs a normal operation as Step S12. The normal operation mentioned here indicates a state where any function, other than the projector 34, such as display of a standby image and telephone-call operation, is used. Then, the control unit 22 of the mobile electronic device 10 determines whether an instruction to activate the projector 34 or an activation instruction is received, as Step S14. When it is determined that the activation instruction of the projector 34 is not received (No), the control unit 22 proceeds to Step S12 and continues the normal operation. In this way, the control unit 22 repeats Step S12 and Step S14 until it is detected that the activation instruction of the projector 34 is received.

When it is determined at Step S14 that the activation instruction of the projector is received or it is determined that the activation instruction is received (Yes), the control unit 22 activates the projector 34 as Step S16. The control unit 22 reads a task to control the operation of the projector 34 from the storage unit 24, to activate the application program. This leads to irradiation (emission) of light from the projector 34, and an image is projected to the projection area. Next, after activating the projector 34 at Step S16, the control unit 22 causes the dedicated key 14 to emit light as Step S18.

After causing the dedicated key 14 to emit light at Step S18, the control unit 22 determines, as Step S20, whether the dedicated key 14 is pressed. When it is determined at Step S20 that the dedicated key 14 is pressed (Yes), the control unit 22 stops irradiation of light from the projector 34 as Step S22. That is, the control unit 22 causes the projector 34 not to project an image. After the irradiation of light is stopped at Step S22, the control unit 22 determines whether a cancellation instruction is received as Step S24. When it is determined at Step S24 that the cancellation instruction is not received (No), the control unit 22 proceeds to Step S22. That is, the control unit 22 repeats Step S22 and Step S24 until the cancellation instruction is received, and repeats determination as to whether the cancellation instruction is received while the irradiation of the light from the projector 34 is stopped. The cancellation instruction is an instruction to cancel the stop of the irradiation or to resume the irradiation. The cancellation instruction is input by the operator.

When it is determined at Step S24 that the cancellation instruction is received (Yes), the control unit 22 resumes the irradiation of the light from the projector 34, as Step S26. That is, the projection of the image is resumed by the projector 34. After the irradiation of the light from the projector 34 is resumed at Step S26, the control unit 22 proceeds to Step S20.

When it is determined at Step S20 that the dedicated key 14 is not pressed (No), the control unit 22 determines, as Step S30, whether an instruction to terminate the drive of the projector 34 or a termination instruction is received. When it is determined at Step S30 that the termination instruction of the projector is not received (No), the control unit 22 proceeds to Step S20, and again determines whether the dedicated key 14 is pressed. That is, the control unit 22 repeats the operations until the drive of the projector 34 is stopped. When it is determined at Step S30 that the termination instruction of the projector is received (Yes), the control unit 22 terminates the drive of the projector 34 as Step S32, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 4.

As explained above, when the dedicated key 14 is pressed, the mobile electronic device 10 stops the irradiation of light by the projector 34. This enables the operator to stop the irradiation of light from the projector 34 by pressing the dedicated key 14 when someone enters an area in the emission direction of light from the projector 34 or when someone is about to look into the light emitting portion 34a of the projector 34. Therefore, the light emitted from the projector 34 can be made hard to enter person's eyes at a close range and the possibility that the person may be dazzled by the emitted light can be reduced with a simple operation performed by the operator. In addition, it is possible to reduce the possibility that the light irradiated from the projector 34 may enter the person's eyes at high intensity.

Provision of the dedicated key 14 enables anyone to easily recognize the input unit for inputting a stop instruction. Moreover, emission of the dedicated key 14 enables anyone to easily find out the dedicated key 14 and to identify a key to be used for entry of the stop instruction even when the projector 34 is used in a dark room. Thus, the safety can be enhanced even at this point and the operability can be further enhanced.

Furthermore, when the irradiation of light from the projector is suspended at Step S22, by setting so as not to resume the irradiation of light from the projector until the cancellation instruction is received from the operator, the operator can check the safety and then resume the irradiation. For example, if someone is present around the projection area even if no one is present in the projection area, it can be set so as not to resume the irradiation.

In the embodiment, the dedicated key is made to emit light upon drive of the projector 34. In addition to or instead of this, it is preferable to notify the operator of a position of a key used as the dedicated key by sound upon activation of the projector 34. The notification by sound enables the operator to easily recognize the key (input unit) used for entry of the stop instruction. Thus the operability can be enhanced. Moreover, it is preferable to emit the dedicated key or to notify the operator of the dedicated key by sound in order to further enhance the operability, however, the present invention is not limited thereto, and thus it may be set so as not to emit and not to notify the dedicated key.

Here, the embodiment is configured to stop the irradiation of light from the projector 34 and not to emit the light from the projector 34, however, the present invention is not limited thereto, and thus the amount of light emitted from the projector 34 may be reduced. In other words, the amount of light emitted from the projector 34 may be decreased. By stopping the emission of the light from the projector 34, when someone comes in the light emission direction of the projector 34, the light can be made hard to enter the person's eyes. However, the reduction in the amount of light also allows less possibility that the person is dazzled by the emitted light. In other words, by reducing the amount of light and making the light weak, even if the light emitted from the projector 34 enters the person's eyes, the possibility that the person is dazzled by the emitted light can be reduced.

Figure 5:
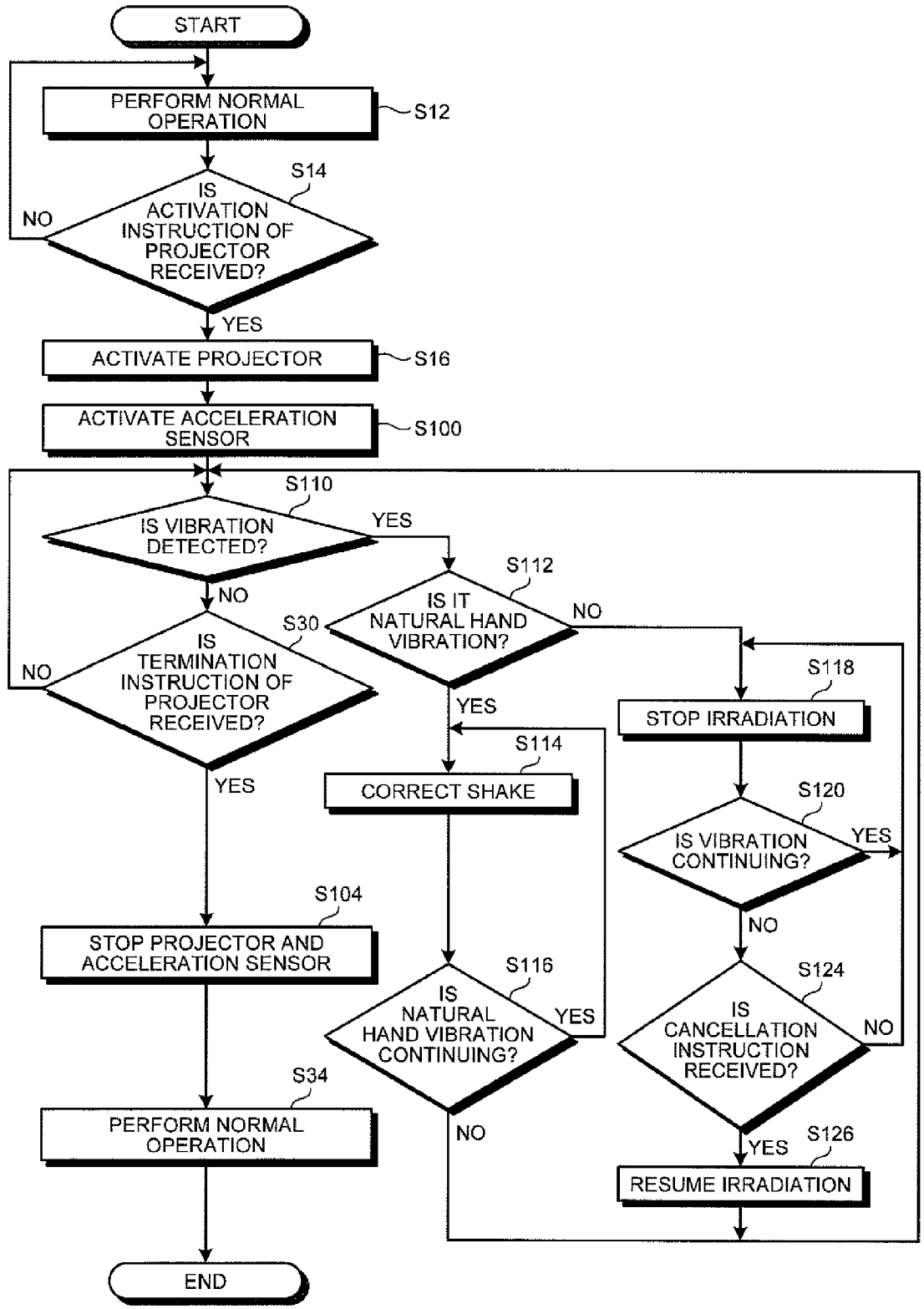
FIG. 5 is a flowchart illustrating another example of the operation of the mobile electronic device.

The embodiment has explained the operation based on whether the dedicated key 14 is pressed, however, the present invention is not limited thereto. The operation of the mobile electronic device 10, specifically, another example of the control operation of the projector will be explained below with reference to FIG. 5. FIG. 5 is a flowchart illustrating another example of the operation of the mobile electronic device. The flowchart illustrated in FIG. 5 is an example of controlling the operation of the projector 34 using the acceleration sensor 36. Here, because the flowchart illustrated in FIG. 5 has portions being the same operations as these in the flowchart illustrated in FIG. 4, detailed explanation of the overlapping portions is omitted, and operations specific to the flowchart illustrated in FIG. 5 will be explained below. In the flowchart illustrated in FIG. 5, a case where the operator uses the projector 34 while holding in hand the mobile electronic device 10 is assumed.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. Next, after activating the projector 34 at Step S16, the control unit 22 activates the acceleration sensor 36 as Step S100.

After activating the acceleration sensor 36 at Step S100, the control unit 22 determines, as Step S110, whether a vibration is detected. That is, the control unit 22 determines whether an acceleration more than a given value is measured by the acceleration sensor 36. The acceleration more than the given value mentioned here refers to an acceleration at which it can be detected that the operator moves or shakes the mobile electronic device. It is noted that an acceleration detected as noise or an acceleration more than a fine acceleration caused by vibration when a person walks along the ground may be determined as an acceleration more than the given value.

Next, when it is determined at Step S110 that the vibration is detected (Yes), the control unit 22 determines whether the detected vibration is a natural hand vibration, as Step S112. Here, whether the vibration is the natural hand vibration is determined based on its detected frequency (cycle of acceleration) and amplitude (magnitude of acceleration). As one example, a vibration whose frequency is 10 Hz or less can be determined as the natural hand vibration.

When it is determined at Step S112 that the vibration is the natural hand vibration (Yes), the control unit 22 performs shake correction as Step S114. Specifically, the control unit 22 corrects the shake of an image projected by the projector 34. That is, the control unit 22 causes the projector 34 to project an image to which the measures for the effect of the natural hand vibration are taken. After performing the shake correction at Step S114, the control unit 22 determines whether the natural hand vibration is continuing as Step S116. Specifically, the control unit 22 determines whether a vibration has occurred and the vibration is a natural hand vibration based on the result of measurement by the acceleration sensor 36. When the vibration has occurred and the vibration is the natural hand vibration, the control unit 22 determines that the natural hand vibration is continuing. When the vibration has not occurred or the vibration is not the natural hand vibration, the control unit 22 determines that the natural hand vibration is not continuing.

When it is determined at Step S116 that the natural hand vibration is continuing (Yes), the control unit 22 proceeds to Step S114. That is, the control unit 22 repeats Step S114 and Step S116 while the natural hand vibration is continuing. When it is determined at Step S116 that the natural hand vibration is not continuing (No), the control unit 22 proceeds to Step S110, and determines again whether a vibration is detected.

When it is determined at Step S112 that the vibration is not the natural hand vibration (No), or when it is determined that the vibration is higher than the natural hand vibration, the control unit 22 stops the irradiation of the light from the projector 34 as Step S118. That is, the control unit 22 causes the projector 34 not to project an image. After the irradiation of the light is stopped at Step S118, the control unit 22 determines whether the vibration is continuing as Step S120. At Step S120, when the vibration higher than the natural hand vibration is detected by the acceleration sensor 36, the control unit 22 determines that the vibration is continuing, while when the vibration higher than the natural hand vibration is not detected, the control unit 22 determines that the vibration is not continuing. When it is determined at Step S120 that the vibration is continuing (Yes), the control unit 22 proceeds to Step S118. That is, the control unit 22 stops the irradiation and repeats Step S118 and Step S120 while the vibration is continuing.

When it is determined at Step S120 that the vibration is not continuing (No), the control unit 22 determines whether a cancellation instruction is received as Step S124. When it is determined at Step S124 that the cancellation instruction is not received (No), the control unit 22 proceeds to Step S118. That is, the control unit 22 repeats from Step S118 to Step S124 until the cancellation instruction is received, and repeats determination as to whether the vibration is continuing or the cancellation instruction is received while the irradiation of light from the projector 34 is stopped. The cancellation instruction is an instruction to cancel the stop of the irradiation or an instruction to resume the irradiation, and is an instruction input by the operator.

When it is determined at Step S124 that the cancellation instruction is received (Yes), the control unit 22 resumes the irradiation of the light from the projector 34 as Step S126. That is, the control unit 22 resumes the projection of an image from the projector 34. After the irradiation of light from the projector 34 is resumed at Step S126, the control unit 22 proceeds to Step S110.

When it is determined at Step S110 that the vibration is not detected (No), the control unit 22 determines whether an instruction to terminate the drive of the projector 34 or a termination instruction is received, as Step S30. When it is determined at Step S30 that the termination instruction of the projector is not received (No), then the control unit 22 proceeds to Step S110, and again determines whether a vibration is detected. That is, the control unit 22 repeats the operations until the drive of the projector 34 is stopped. When it is determined at Step S30 that the termination instruction of the projector is received (Yes), the control unit 22 terminates the drive of the projector 34 and the acceleration sensor 36 as Step S104, then returns the operation to the normal operation as Step S34, and, thereafter, ends the process. When returned to the normal operation, the control unit 22 determines again whether the activation instruction of the projector is received. That is, the control unit 22 repeats the operations in the flowchart illustrated in FIG. 5.

In this way, by controlling the operation of the projector 34 based on the acceleration, it is possible to stop the irradiation of the light emitted from the projector 34 when the external force is applied to the mobile electronic device 10 and its status thereby changes. With this feature, for example, when sensing the danger, the operator flicks or shakes the mobile electronic device 10, so that the irradiation of the light from the projector 34 can be stopped. This enables the operator to stop the irradiation of the light from the projector 34 with a simple operation and a momentary operation. Moreover, if someone suddenly picks up the mobile electronic device 10 placed on a desk, the irradiation of the light from the projector 34 can be stopped. This makes it possible to prevent the light from being emitted from the projector 34 when the projection area is suddenly changed or when the projection area is displaced by an unexpected operation.

When the vibration is detected, by determining whether the detected vibration is natural hand vibration, an image can be projected from the projector 34 even when the operator manipulates the mobile electronic device 10 while holding it. It should be noted that because a more appropriate image can be displayed, the shake correction is performed in the present embodiment, however, the shake correction may not necessarily be performed.

As explained above, when the irradiation of light from the projector 34 is suspended at Step S22, by setting so as not to resume the irradiation of light from the projector until the cancellation instruction is received from the operator, the operator can check the safety and resume the irradiation. For example, if someone is present around the projection area even if no one is in the projection area, it can be configured so as not to resume the irradiation.

The mobile electronic device 10 is configured to stop the irradiation of light from the projector 34 and not to emit the light from the projector 34, however, the present invention is not limited thereto. Thus, similarly to the above case, the amount of light emitted from the projector 34 may be reduced (decreased). By stopping the emission of the light from the projector 34, when a person comes in the emission direction of the light from the projector 34, the light can be made hard to enter person's eyes. However, even by reducing the amount of light, the possibility that the person is dazzled by the emitted light can be decreased. In other words, by reducing the light amount and making the light weak, even if the light emitted from the projector 34 may enter person's eyes, the possibility that the person is dazzled by the emitted light can be reduced.

Moreover, the operation control in FIG. 4 may be used in combination with the operation control in FIG. 5. The mobile electronic device 10 according to the present embodiment includes the acceleration sensor, however, if values measured by the acceleration sensor are not used for the operation control, the acceleration sensor may not be provided therein.

In the embodiment, the dedicated key 14 is provided on a front face of the cabinet 11 (the front face of the cabinet 11 herein refers to the face where the operation keys 13 are formed), however, the location where the dedicated key 14 is provided is not particularly limited. Therefore, the dedicated key 14 may be provided on a side face of the cabinet 11, on the bottom of the cabinet 11, or on the top face of the cabinet 11. In the embodiment, the dedicated key 14 is provided separately from the operation keys 13, however, the present invention is not limited thereto. Therefore, any key may be used as a key (input unit) through which an instruction to stop the emission of light from the projector 34 is input. For example, the mobile electronic device 10 may be configured to stop the irradiation of light from the projector 34 if a specific key among the operation keys 13 is pressed or to stop the irradiation of light from the projector 34 if any one of the operation keys 13 is pressed, regardless of types of keys. In addition, a touch panel may be used as keys instead of using buttons as explained in the embodiment. In this case, if the touch panel is touched, then the irradiation of light from the projector 34 is simply stopped. That is, a part of or all of the operation keys 13 used to input an instruction for any other operation may be used as an input unit for inputting an instruction to stop emission of light or an input unit including the function of the dedicated key in the embodiment. In this case, also, at the time of driving the projector 34, the input unit (key, touch panel) for inputting an instruction to stop emission of light is caused to emit light or is notified by sound, so that the input unit for inputting the instruction to stop emission of light from the projector can be easily recognized. This enables the operability to be enhanced. This also enables irradiation of light from the projector to be easily stopped in case of necessity.

A plurality of dedicated keys (exactly, an input unit having the function of the dedicated key according to the embodiment upon the drive of the projector 34) is preferably provided in the mobile electronic device. By providing the dedicated keys therein, the irradiation of light from the projector 34 can be more easily stopped in case of necessity.

Figure 6:
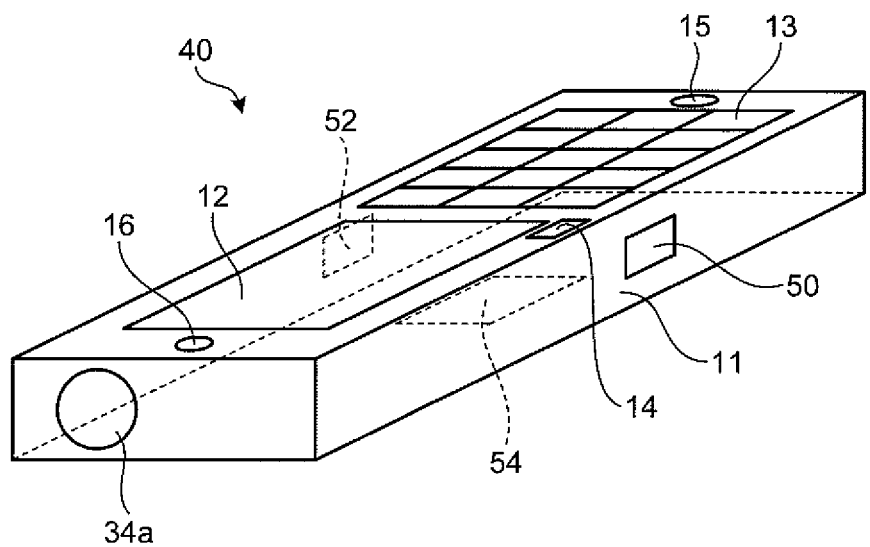
FIG. 6 is a perspective view illustrating a schematic configuration of another embodiment of the mobile electronic device.

Furthermore, it is more preferable to provide a dedicated key on each of a plurality of faces of the cabinet. FIG. 6 is a perspective view illustrating a schematic configuration of another embodiment of the mobile electronic device according to the present invention. A mobile electronic device 40 illustrated in FIG. 6 will be explained in detail below. The mobile electronic device 40 illustrated in FIG. 6 is configured in the same manner as that of the mobile electronic device 10 illustrated in FIG. 1 except for the number of dedicated keys and their layout. Therefore, explanation of the same components as these of the mobile electronic device 10 is omitted, and a configuration specific to the mobile electronic device 40 will be explained below.

The mobile electronic device 40 illustrated in FIG. 6 is provided with a plurality of dedicated keys 14, 50, 52, and 54. The dedicated key 14 is provided on the face of the cabinet where the display 12 and the operation keys 13 are provided. The dedicated key 50 is provided on a side face of the cabinet 11 (one of the faces substantially orthogonal to the face where the operation keys 13 are provided and one of the faces whose one side meets one of long sides of the face where the operation keys 13 are provided). The dedicated key 52 is provided on the other side face of the cabinet 11 (face opposite to the side face, of the faces substantially orthogonal to the face where the operation keys 13 are provided). The dedicated key 54 is provided on the back side of the cabinet 11 (face opposite to the face where the operation keys 13 are provided). That is, the mobile electronic device 40 is provided with the dedicated keys 14, 50, 52, and 54 on the four faces of the cabinet 11 respectively. Each of the dedicated keys 14, 50, 52, and 54 includes a light emitter which emits light as necessary. The mobile electronic device 40 is configured in the above manner.

By providing the dedicated keys on a plurality of faces of the cabinet 11 as explained in the mobile electronic device 40, even if one of the faces where the dedicated keys are provided is in contact with a member, such as a table and a desk, supporting the mobile electronic device 40 and becomes invisible, the other faces can be exposed. This enables the dedicated key to be pressed quickly and reliably in case of necessity. That is, it is possible to prevent occurrence of such a situation that the dedicated key is unseen when the projector 34 is driven and therefore the dedicated key cannot be pressed quickly in case of necessity. This enable the operability to be further enhanced.

Figure 7:
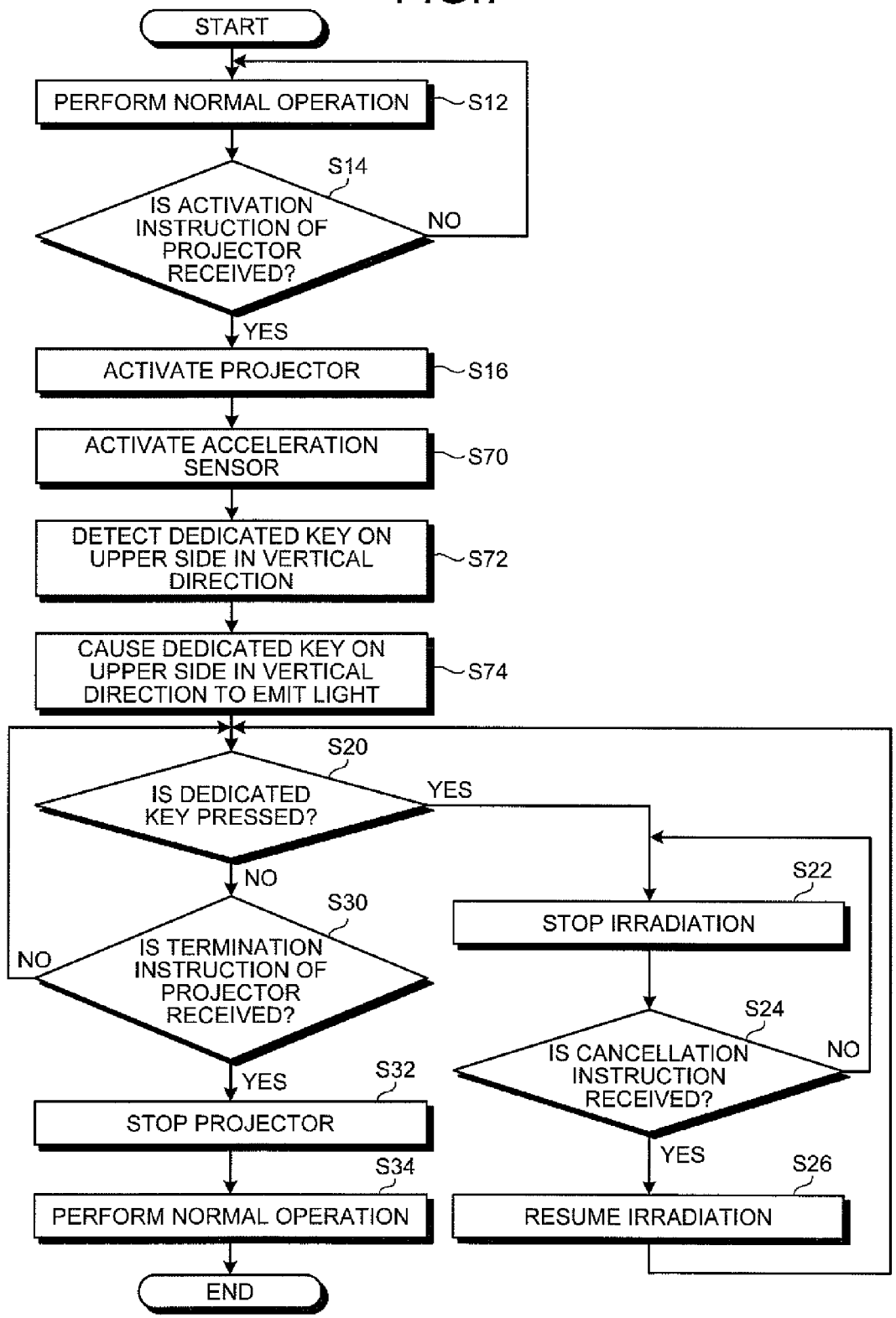
FIG. 7 is a flowchart illustrating another example of the operation of the mobile electronic device.

Next, one example of the operation of the mobile electronic device 40 will be explained. FIG. 7 is a flowchart illustrating another example of the operation of the mobile electronic device. Here, because the flowchart illustrated in FIG. 7 has portions being the same operations as these in the flowchart illustrated in FIG. 4, detailed explanation of the overlapping portions is omitted, and operations specific to the flowchart illustrated in FIG. 7 will be explained below. Specifically, operations from Step S12 to Step S16, from Step S20 to Step S26, and from Step S30 to Step S34 are the same as these at the steps illustrated in FIG. 4, and therefore detailed explanation is omitted.

After activating the projector 34 at Step S16, the control unit 22 activates the acceleration sensor 36 as Step S70. After activating the acceleration sensor 36 at Step S70, the control unit 22 detects a dedicated key on the upper side in the vertical direction as Step S72. Specifically, the control unit 22 uses the acceleration sensor 36 to detect a direction on which gravity is acting and detect the vertical direction. The control unit 22 further detects a direction of the cabinet 11 from the detected value by the acceleration sensor 36. The control unit 22 detects the vertical direction of the cabinet 11 from the direction on which gravity is acting and from the direction of the cabinet 11, which are detected by the acceleration sensor 36, and detects a uppermost dedicated key in the vertical direction among the dedicated keys. The direction on which gravity is acting and the direction of the cabinet 11 can be detected by calculating a reference calibrated when the mobile electronic device 40 is assembled.

When the dedicated key on the upper side in the vertical direction is detected at Step S72, the control unit 22 causes the dedicated key on the upper side in the vertical direction to emit light as Step S74. Thereafter, the control unit 22 proceeds to Step S20. The subsequent operations are the same as these in the flowchart illustrated in FIG. 4.

In this way, by causing a dedicated key on the upper side in the vertical direction, which is basically most easily operated among the dedicated keys, to emit light and using it as the dedicated key, the operator can easily find out the dedicated key and easily press the dedicated key. This allows the operability to be further enhanced.

The present embodiment is configured to cause only the dedicated key on the upper side in the vertical direction to emit light, however, the dedicated keys on the faces other than the face in contact with the support such as a desk may be caused to emit light.

The embodiment is configured to select a dedicated key to be emitted depending on the direction of the mobile electronic device 40, however, the present invention is not limited thereto. Therefore, only a dedicated key (exactly, an input unit usable as the dedicated key) provided in a given direction upon the drive of the projector 34 may be able to be used as an input unit for inputting a stop instruction. For example, only an uppermost dedicated key in the vertical direction may be able to be used as the input unit for inputting the stop instruction.

Here, the control unit 22 may use the dedicated key (an input unit usable as a dedicated key) provided on a face other than the face on the under side in the vertical direction, as an input unit for inputting the stop instruction. This enables to use only the dedicated key, which can be substantially used, as the input unit for inputting the stop instruction upon the drive of the projector 34. It is also possible to prevent malfunction of a dedicated key caused by contact between the support and the dedicated key on the under side in the vertical direction.

The dedicated key may further be provided on the face of the cabinet where the light emitting portion 34a of the projector 34 is formed, however, it is preferable to provide the dedicated key on any face other than the face of the cabinet where the light emitting portion 34a of the projector 34 is formed. By providing the dedicated key on any face other than the face of the cabinet where the light emitting portion 34a of the projector 34 is formed, even if the operator faces the face where the dedicated key is provided when manipulating the dedicated key, the light emitted from the projector 34 can be hard to illuminate the operator.

The embodiment has been explained on the assumption that the mobile electronic device 10 is basically placed on a desk or a chair for use, however, the projector 34 of the mobile electronic device 10 may also be used while the operator is holding it in hand. Therefore, as a mode to drive the projector 34, it is preferable that the mobile electronic device 10 have two modes: a mobile mode (first mode) which is assumed that the operator uses the projector 34 while holding in hand the mobile electronic device 10 (cabinet 11) and a stationary mode (second mode) which is assumed that the operator uses the projector 34 while the mobile electronic device 10 (cabinet 11) is placed on a desk, a table, or a charging base. Here, the control in FIG. 4 has to be performed when the stationary mode is activated. In this way, the two modes are preferably provided and switched to each other as required.

Figure 8:
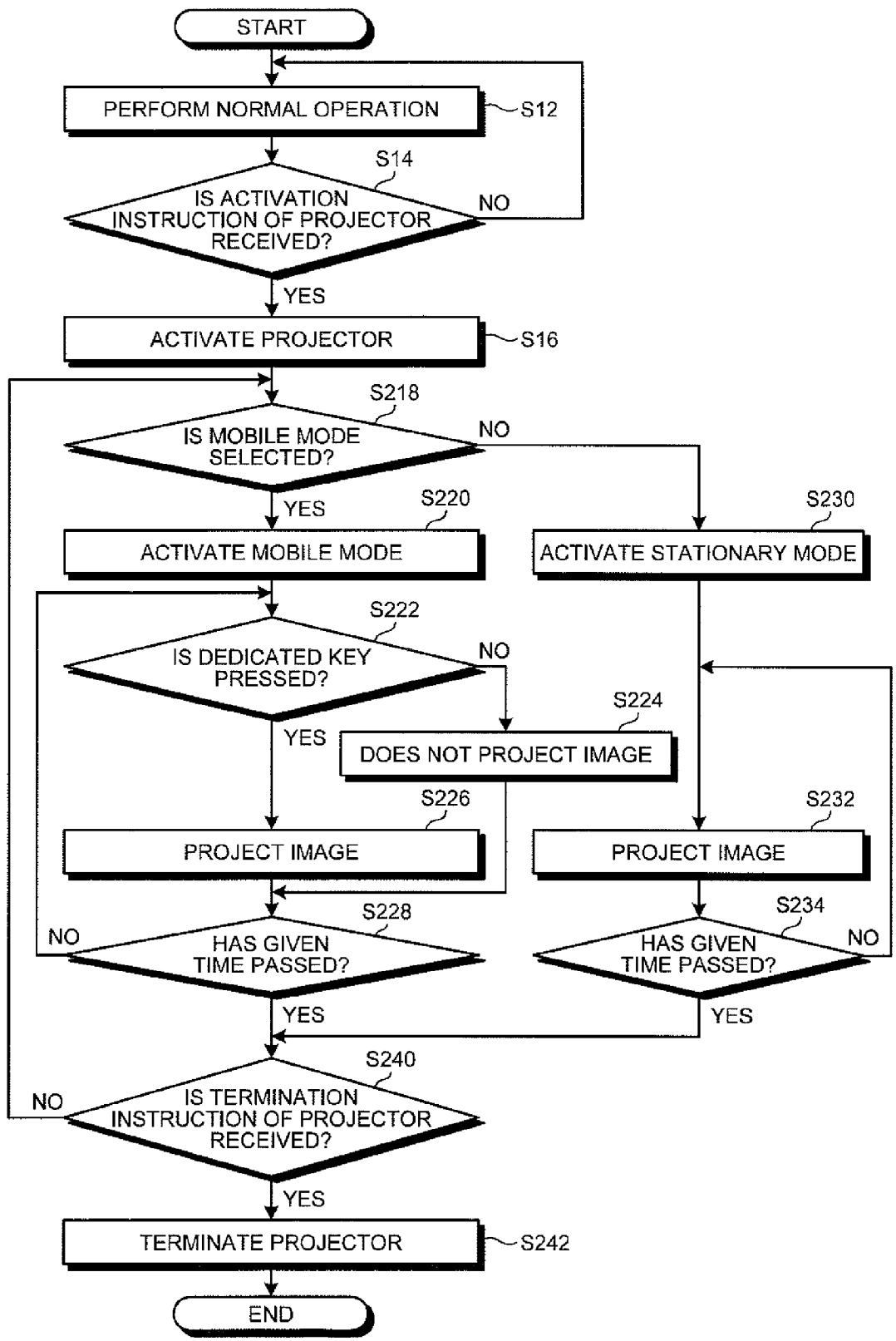
FIG. 8 is a flowchart illustrating another example of the operation of the mobile electronic device.

The operation control for switching between the two modes will be explained in detail below with reference to FIG. 8. FIG. 8 is a flowchart illustrating another example of the operation of the mobile electronic device. Here, because the flowchart illustrated in FIG. 8 has portions being the same operations as these in the flowchart illustrated in FIG. 4, detailed explanation of the overlapping portions is omitted, and operations specific to the flowchart illustrated in FIG. 8 will be explained below.

First, the mobile electronic device 10 performs the normal operation as Step S12. Next, the control unit 22 of the mobile electronic device 10 determines whether an activation instruction is received as Step S14. When it is determined that the activation instruction of the projector 34 is not received (No), the control unit 22 proceeds to Step S12 and continues the normal operation. When it is determined at Step S14 that the activation instruction is received (Yes), the control unit 22 activates the projector 34 as Step S16. Then, after activating the projector 34 at Step S16, the control unit 22 determines whether the mobile mode is selected as Step S218. Control methods of the mobile mode and the stationary mode will be explained below together with their operations. The mobile mode or the stationary mode according to the present embodiment is selected by the operator. As a timing in which the operator selects the mode, it may be selected at a step at which the control unit 22 proceeds to Step S218, or it may be selected as a previous setting when the normal operation is performed before activation of the projector.

When it is determined at Step S218 that the mobile mode is selected (Yes), then the control unit 22 activates the mobile mode as Step S220. After activating the mobile mode at Step S220, the control unit 22 determines whether the dedicated key 14 is pressed as Step S222. When it is determined at Step S222 that the dedicated key 14 is not pressed (No), the control unit 22 causes the projector 34 not to project an image as Step S224. That is, the control unit 22 causes the projector 34 not to emit the light. When it is determined at Step S222 that the dedicated key 14 is pressed (Yes), then the control unit 22 causes the projector 34 to project an image as Step S226. That is, the control unit 22 causes the projector 34 to emit the light.

After controlling whether the image is to be projected at Step S224 or Step S226, the control unit 22 determines whether a given time has passed, as Step S228. At Step S228, when it is determined that the given time has not passed (No), then the control unit 22 proceeds to Step S222, while when it is determined that the given time has passed (Yes), then the control unit 22 proceeds to Step S240. In this manner, the control unit 22 repeats the operations from Step S222 to Step S228 until the given time has passed, and switches between processes as to whether the image is to be projected depending on whether the dedicated key 14 is pressed.

When it is determined at Step S218 that the mobile mode is not selected (No), then the control unit 22 activates the stationary mode as Step S230. After activating the stationary mode at Step S230, the control unit 22 causes the projector 34 to project an image, as Step S232. Here, in the stationary mode, as explained in FIG. 4, the dedicated key 14 is caused to emit light, and if the dedicated key 14 is pressed, the irradiation of light from the projector 34 is stopped. As one specific example, the control unit 22 controls the processes from Step S18 to Step S30 illustrated in FIG. 4. In this case, because Step S30 is equivalent to Step S240, actual operations are these right before Step S30. After causing the projector 34 to project an image at Step S232, the control unit 22 determines whether the given time has passed, as Step S234. At Step S234, when it is determined that the given time has not passed (No), then the control unit 22 proceeds to Step S232, while when it is determined that the given time has passed (Yes), then the control unit 22 proceeds to Step S240. In this manner, the control unit 22 repeats the operations at Step S232 and Step S234 until the given time has passed, and continues to project images from the projector 34.

When the given time has passed at Step S228 or at Step S234, then the control unit 22 determines whether an instruction to terminate the drive of the projector 34 or a termination instruction is received, as Step S240. When it is determined at Step S240 that the termination instruction of the projector is not received (No), then the control unit 22 proceeds to Step S218, again detects a selected mode, and controls the operation of the projector 34 based on the selected mode. That is, the control unit 22 repeats the operations until the drive of the projector 34 is stopped. When it is determined at Step S240 that the termination instruction of the projector is received (Yes), the control unit 22 terminates the drive of the projector 34 as Step S242, returns the operation to the normal operation, and ends the process. When the operation is returned to the normal operation, the control unit 22 determines again whether the activation instruction of the projector is received. That is, the control unit 22 repeats the operations in the flowchart illustrated in FIG. 8.

As explained above, in the flowchart illustrated in FIG. 8, the two modes, the mobile mode and the stationary mode, can be selected. When the mobile mode is selected, the control unit 22 causes the projector 34 to project an image only when the dedicated key 14 is pressed, while when the stationary mode is selected, the control unit 22 causes the projector 34 to project an image only when the dedicated key 14 is not pressed.

In this way, when a projection position of an image or an irradiation position of light easily changes in such a case that the operator uses the mobile electronic device in hand, the mobile mode is selected and the image is projected only when the dedicated key 14 is pressed, which allows an instant stop of the image projection when a person cuts in the projection area of the image, that is, allows the light irradiation to be stopped. Especially, if the emitted light is irradiated to the person's face, the operator can stop the irradiation of the light only by releasing the dedicated key 14, which allows less possibility that the person is dazzled by the irradiated light. Even if the operator accidentally drops the mobile electronic device, the irradiation of the light is stopped. Therefore, when it is not known in which direction the light is irradiated while it is falling, the possibility of light irradiation can be reduced, which allows less possibility that the person is dazzled by the irradiated light.

In this manner, the operation controls can be switched to one another according to the use condition, and therefore even if the operator uses the mobile electronic device while holding it in hand, the operability can be enhanced while the possibility that the person is irradiated with the light can be further reduced.

When the projection position of an image does not basically change in such a case that the mobile electronic device 10 is used while being placed on a desk, a chair, or a table, the stationary mode is selected and an image is projected, and this enables the image to be projected in a state where the mobile electronic device 10 is placed thereon. In this case also, as explained above, by providing the controls as illustrated in FIG. 4, the possibility that the light emitted from the projector 34 may enter the person's eyes can be reduced, thus enhancing the operability.

In the embodiment, it is configured that the operator selects whether the mobile mode is set or the stationary mode is set, however, the present invention is not limited thereto. Therefore, it may be configured that the mobile electronic device 10 detects its conditions and automatically select one of the modes.

For example, the acceleration sensor 36 detects an acceleration acting on the cabinet 11, so that the mode may be selected (switched) based on the detected acceleration. As one example, when no acceleration is detected or when it can be determined as substantially zero (when any acceleration other than that applied by gravity is not detected), the control unit 22 may select the stationary mode, and if any case other than this case, the control unit 22 may select the mobile mode. Moreover, when an acceleration more than a given value is detected, the control unit 22 may also set the mobile mode. In this manner, by switching one mode to the other based on the acceleration, an appropriate control mode can be selected without any operation performed by the operator, thus further enhancing the operability. In addition, by setting so as to automatically switch between the modes, it is possible to prevent that the stationary mode is selected even though the operator is holding the mobile electronic device 10.

Moreover, the control unit 22 detects a frequency of force and a magnitude of the force (amplitude) from the acceleration acting on the cabinet 11, and may select the mobile mode when the detected values are numerical values which can be determined as natural hand vibration. Specifically, in the flowchart illustrated in FIG. 5, when the control unit 22 proceeds to Step S114, the mode is determined as the mobile mode, while the control unit 22 proceeds to Step S30 and Step S118, the mode may be determined as the stationary mode. In this manner, by determining whether the operator is holding the cabinet based on the natural hand vibration, and this allows discrimination between shaking caused by the operator holding it and any other shaking (e.g., shaking caused by an object having hit a desk), thus further enhancing the operability.

In the embodiment, the dedicated key 14 used in the stationary mode (that is, a key used to input an instruction to stop emission of light from the projector in case of necessity) and the dedicated key 14 used in the mobile mode are used as one dedicated key, however, the present invention is not limited thereto. Therefore, dedicated keys may be separately provided for respective modes. As for the dedicated key used in the mobile mode, similarly to the dedicated key used in the stationary mode, a function as a dedicated key may be provided in one or more of the operation keys. That is, a key is not limited to the key used only as the dedicated key in the mobile mode, but a key having a plurality of functions may be used as a dedicated key in the mobile mode.

Selection is not limited to the selection between the mobile mode and the stationary mode based on the acceleration detected by the acceleration sensor 36. Therefore, it may be detected whether the mobile electronic device 10 is connected to an external power supply (e.g., AD adaptor) used for charging, and a mode may be selected based on the detected result. As a detector that detects whether the power supply and the mobile electronic device 10 are connected to each other, a detection sensor that detects whether a connection terminal of the mobile electronic device 10 is connected with the power supply and a detection sensor that detects power, voltage and/or current supplied externally to the mobile electronic device 10 can be used.

In this way, based on whether the mobile electronic device 10 is connected to the power supply, when the modes are switched to each other, it can be set so as to select the stationary mode if it is detected that the mobile electronic device 10 is connected to the power supply, and to select the mobile mode if it is not detected that the mobile electronic device 10 is connected to the power supply or it is detected that the mobile electronic device 10 is not connected to the power supply. Thus, when the mobile electronic device 10 is connected to the power supply (power-supply cord) and its movement is restricted, then the mode can be set as the stationary mode, while when its movement is not restricted, then the mode can be set as the mobile mode.

When the power is to be detected, it is preferably identified whether the power is supplied from a commercial power supply such as a provided outlet or is supplied from a dry-cell battery or from a battery of PC and the like connected thereto through USB, based on supplied power, voltage and/or current. In the case where the power can be identified in this manner, it is preferable to select the stationary mode when the power is supplied from the commercial power supply. This can change the mode to be selected depending on whether it is connected to a freely movable power supply such as a dry-cell battery or it is connected to a commercial power supply in which a movement range is restricted by the cord.

When the mobile electronic device 10 is to be charged, it is detected whether the mobile electronic device 10 is placed on a charging base, and the mode may be selected based on the result of detection. Here, as a detector that detects whether the mobile electronic device 10 is placed on the charging base, a contact detection sensor is simply provided at a contact position of the cabinet 11 with the charging base.

In this way, based on whether the mobile electronic device 10 is placed on the charging base, when the modes are switched to each other, it can be set so as to select the stationary mode if it is detected that the mobile electronic device 10 is placed on the charging base, and to select the mobile mode if it is not detected that the mobile electronic device 10 is placed on the charging base or it is detected that the mobile electronic device 10 is not placed on the charging base. Thus, when the mobile electronic device 10 is placed on the charging base and its movement is restricted, then the mode can be determined as the stationary mode, while its movement is not restricted, then the mode can be determined as the mobile mode, which allows enhancement of the safety and the operability.

Moreover, the present invention is not limited to the case where the mode is determined according to the status of the mobile electronic device 10 or according to whether the mobile electronic device 10 is connected to the power supply, or according to whether it is placed on the charging base.

FIGS. 9A to 9D are explanatory diagrams of one example of controls in the mobile electronic device, or explanatory diagrams illustrating operation patterns. First, the operation pattern as illustrated in FIG. 9A is an operation pattern in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, the stationary mode cannot be selected but the mobile mode can be selected. In other words, the operation pattern as illustrated in FIG. 9A is the one in which one mode is selected according to the status of the mobile electronic device 10.

The operation pattern illustrated in FIG. 9B is the one in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, both the stationary mode and the mobile mode can be selected. In the case of this operation pattern, when the mobile electronic device is not placed on the charging base and is not connected to the power supply, the operator can select whether to set the stationary mode or to the mobile mode.

The operation pattern illustrated in FIG. 9C is the one in which when the mobile electronic device 10 is placed on the charging base and/or is connected to the power supply, both the stationary mode and the mobile mode can be selected, while when the mobile electronic device 10 is not placed on the charging base and is not connected to the power supply, the stationary mode cannot be selected but the mobile mode can be selected. In the case of this operation pattern, when the mobile electronic device 10 is placed on the charging base and/or is connected to the power supply, the operator can select whether to set the stationary mode or to set the mobile mode.

The operation pattern illustrated in FIG. 9D is the one in which in both the cases where the mobile electronic device 10 is placed on the charging base and/or is connected to the power supply and where the mobile electronic device 10 is not placed on the charging base and is not connected to the power supply, both the stationary mode and the mobile mode can be selected. In the case of this operation pattern, the operator can select whether to set the stationary mode or to set the mobile mode in both of the cases.

In this way, as any one of the four operation patterns as illustrated in FIG. 9A to FIG. 9D, the two modes can be selected. Moreover, the operator may set one operation pattern from among the four operation patterns, or may store only one operation pattern among the four operation patterns as an application program.

In the embodiment, the acceleration sensor 36 is provided in the mobile electronic device 10. However, when the detection result of the acceleration is not used at the time of selecting the mobile mode or the stationary mode, the acceleration sensor 36 is not necessarily provided. For example, when the mode is selected only through the selection operation by the operator, there is no need to provide the acceleration sensor.

Industrial Applicability

As explained above, the mobile electronic device according to the present invention is suitable for projecting an image in a state in which high safety is ensured.

The invention claimed is:

1. A mobile electronic device with an image projector comprising:
    an image projector that projects configured to project an image;
    a cabinet;
    an input unit disposed on the cabinet and detects an operation input by an operator; and
    a control unit that controls an operation of the image projector and a state of the input unit, wherein
    the input unit includes an acceleration detector configured to detect a vibration,
    the control unit determines whether the detected vibration by the input unit is a natural hand vibration, and
    when it is determined that the detected vibration is not the natural hand vibration, the control unit stops emission of light from the image projector or reduces an amount of light emitted from the image projector.

2. The mobile electronic device with an image projector according to claim 1, further comprising:
    a direction detection sensor that detects a direction of the cabinet, wherein, with respect to the input unit provided on the faces,
    the control unit enables the input unit, to be used, provided on one of the faces other than a face on an under side in a vertical direction, based on a result of detection by the direction detection sensor.

3. The mobile electronic device with an image projector according to claim 2, wherein, with respect to input unit provided on the faces,
    the control unit enables the input unit, to be used, provided on one of the faces other than the face on the under side in the vertical direction and the face where the image projector is provided, based on a result of detection by the direction detection sensor.

4. The mobile electronic device with an image projector according to claim 3, wherein the control unit causes a portion used for the predetermined operation in the input unit to emit light when an image is projected by the image projector.

5. The mobile electronic device with an image projector according to claim 4, wherein the input unit is a touch sensor.

6. The mobile electronic device with an image projector according to claim 4, wherein the input unit is a button.

7. The mobile electronic device with an image projector according to claim 1, wherein the acceleration detector of the input unit is configured to detect an acceleration acting on the cabinet.

8. The mobile electronic device with an image projector according to claim 1, wherein after the emission of light from the image projector is stopped or the amount of light emitted from the image projector is reduced, the control unit causes the image projector not to increase the amount of light emitted therefrom until a resume instruction input to the input unit is detected.

9. The mobile electronic device with an image projector according to claim 1, wherein when it is determined that the vibration is the natural hand vibration, the control unit does not reduce an amount of light emitted from the image projector.

* * * * *